United States Patent [19]

Wilson

[11] 4,266,569
[45] May 12, 1981

[54] CHECK VALVE

[76] Inventor: Harold L. Wilson, Antonia, Mo. 63052

[21] Appl. No.: 33,049

[22] Filed: Apr. 25, 1979

[51] Int. Cl.³ .................................................. F16K 15/03
[52] U.S. Cl. ................................. 137/527.8; 137/527.2
[58] Field of Search ................... 137/527, 527.2, 527.6, 137/527.8

[56] References Cited

U.S. PATENT DOCUMENTS

| | | | |
|---|---|---|---|
| 274,204 | 3/1883 | Lawson | 137/527.8 |
| 705,255 | 7/1902 | Leidecker | 137/527 |
| 1,330,265 | 2/1920 | Hinton | 137/527 |
| 1,347,199 | 7/1920 | Winters | 137/527 X |
| 1,829,666 | 10/1931 | Minster | 137/527.8 X |
| 2,029,633 | 2/1936 | Muhleisen | 137/527 X |
| 3,720,225 | 3/1973 | Wheatley | 137/527.8 X |
| 3,937,168 | 2/1976 | Doak | 137/527.8 X |
| 4,095,615 | 6/1978 | Ramsauer | 137/527.8 |
| 4,164,958 | 8/1979 | Jaconette | 137/527.8 X |

FOREIGN PATENT DOCUMENTS 1214619 12/1970 United Kingdom .................. 137/527.8

*Primary Examiner*—Robert G. Nilson
*Attorney, Agent, or Firm*—Glenn K. Robbins

[57] ABSTRACT

An improved check valve of rigid plastic tubing of inexpensive fabrication. The check valve is made of plastic tubing into which a chord-like slot is cut in one embodiment and into which is dropped in the process of manufacture a valve support arm to which is connected a swinging valve member of a plate-like construction. The interior of the plastic tubing which forms the valve housing has an interior ring-like valve seat against which the valve member can seat in one direction of fluid flow. In the reverse direction of flow the valve member can be pivoted to open the valve. The valve housing is simply closed by a arcuate cover member fitting over the valve support arm. In another embodiment a valve shaft fitted in a chord-like position through the housing may support for rotary movement thereon a valve member having a sleeve receiving the shaft. The valve member is generally circular with a chord-like boundary at one edge which is adapted to seat against a chord-like baffle. In the process of manufacture the valve member is fitted inside the housing and the valve shaft is inserted from the exterior through an opening in the housing and the valve member sleeve and a second opening in the housing. The simply constructed valve may be provided with threads in order that it may be inserted in conventional plastic tubing, piping or the like.

7 Claims, 14 Drawing Figures

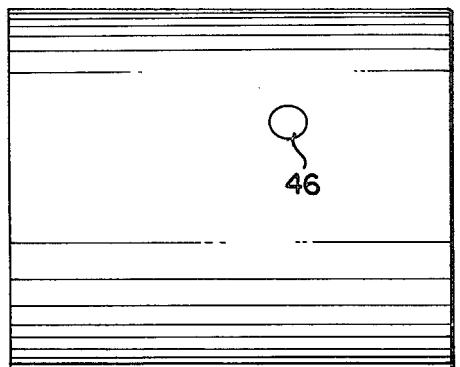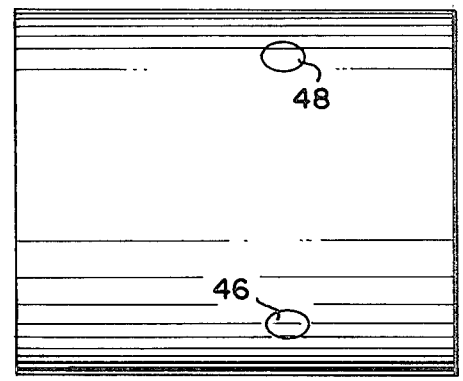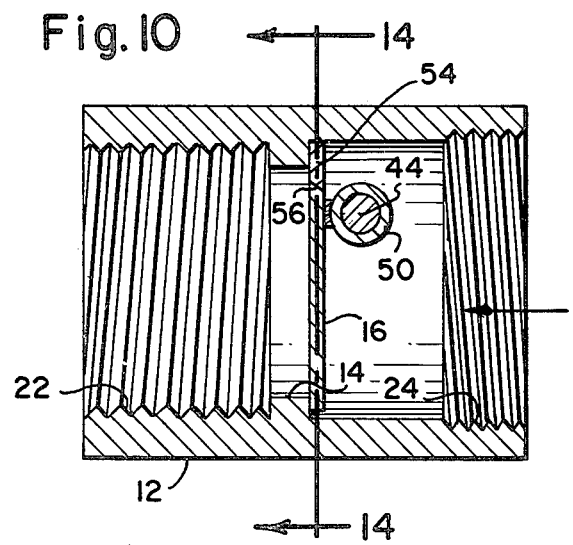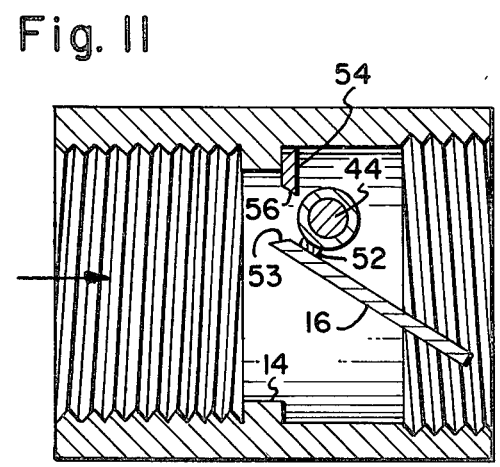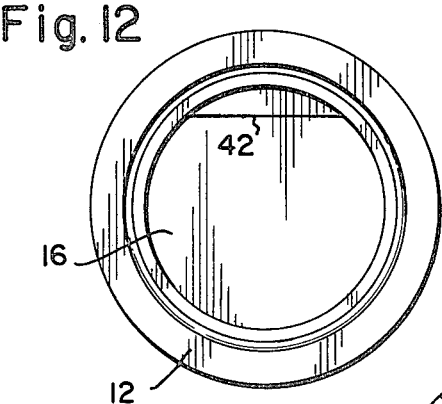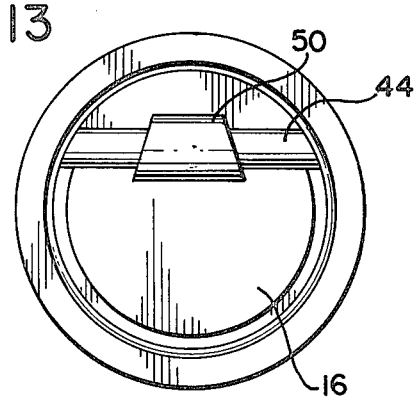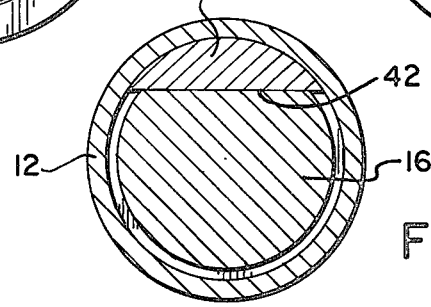

CHECK VALVE

SUMMARY OF THE INVENTION

In the past various types of check valves have been manufactured for various use in industrial process industries, domestic and residential installations, and the like. Such valve members generally have been required to be of special fabrication of metal and are of some considerable degree of expense and complexity. A wide range of adaptability and use of various check valves is conventional where uni-directional flow is desired to pass fluid in one direction and by the force of the fluid cause the valve member to close against a valve seat in the reverse direction of fluid flow.

By means of this invention there has been provided a simply constructed tubular check valve which may be simply fabricated and designed for use in a wide range of installations and usages. The check valve is simply comprised of a rigid plastic tubular housing which may have formed in it an internal ring-like valve seat. A generally circular plate-like valve member having a chord-like boundary at one edge is pivotably supported at a chord-like position inside the valve housing to pivot about the chord-like position. A chord-like baffle closes off the flow above the chord-like boundary of the valve member.

In one form the check valve a slot of a chord-like nature is cut across the valve housing and the valve and support arm are simply inserted and caused to seat in the slot. A cover is then placed over the slot and the valve structure is completed. The fabrication of the valve is quite simple and can be accomplished in the field at very little cost in the process of manufacture.

In another form of the check valve the pivotable movement of the valve member is provided by rotation or pivoting about a fixed valve shaft connected inside the housing at a chord-like position. In this embodiment the generally circular valve plate has a sleeve portion loosely receiving the valve shaft to provide for a swinging movement of the valve member about the valve shaft in response to the direction of flow of the fluid within the valve. The chord-like edge of the valve member in the closed position seats against a chord-like baffle provided inside the housing adjacent the valve shaft and which blocks the flow inside the housing above the valve member.

By means of the plastic tubular construction a very low fabrication cost is realized. The valve member itself is of simple circular plate or disc-like construction and is likewise of very low cost. The affixation or securing of the valve member to the support arm through a flexible or hinged connection is likewise very simply effected. The valve is constructed with an arc-like closure member fitting over the slot for holding the valve support arm in place in the first embodiment or by threading of the valve shaft through the valve sleeve in the modification. When the simple fabrication described has been completed the valve is ready for use. By appropriate threading of the ends of the tubular valve housing connection can be made to any type of tubing or piping as desired.

The above features are objects of this invention and further objects will appear in the detailed description which follows and will be otherwise apparent to those skilled in the art.

For the purpose of illustration of this invention there is shown in the accompanying drawings a preferred embodiment thereof. It is to be understood that these drawings are for the purpose of illustration only and that the invention is not limited thereto.

IN THE DRAWINGS

FIG. 8, is a view in side elevation of a modification of the check valve.

FIG. 9, is a top plan view of the modified check valve.

FIG. 10, is a view in vertical and longitudinal section of the modified valve showing the valve plate in the closed position.

FIG. 11, is a view taken similarly to FIG. 10 showing the valve in the open position.

FIG. 12, is a view in end elevation of the valve taken from the left end of FIG. 10.

FIG. 13, is a view in end elevation of the valve taken from end of FIG. 10.

FIG. 14, is a reduced scale view in section taken on the line 14—14 of FIG. 10.

DESCRIPTION OF THE INVENTION

Figure 1:
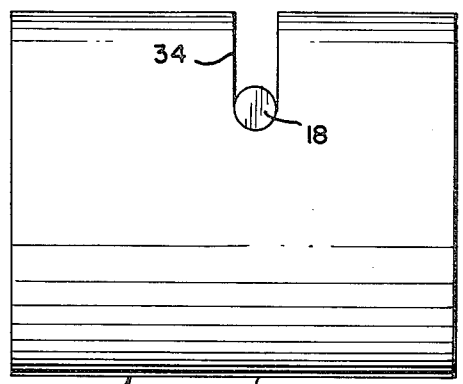
FIG. 1, is a view in side elevation of the check valve.
Figure 2:
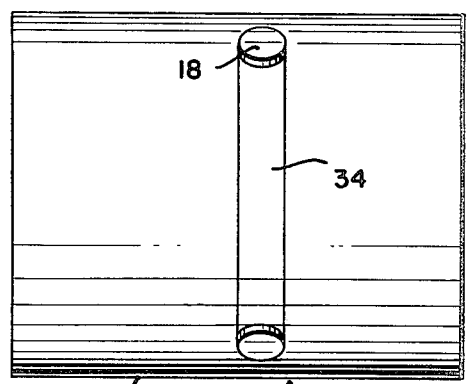
FIG. 2, is a top plan view of the check valve.

The valve of this invention in a first embodiment is generally identified by the reference numeral 10. It is comprised of a plastic tubular valve housing 12 having an internal ring-like valve seat 14. A pivotable valve member 16 is connected to a support arm 18 fitting within a slot 20 formed by a chord-like cut in the valve housing.

Figure 3:
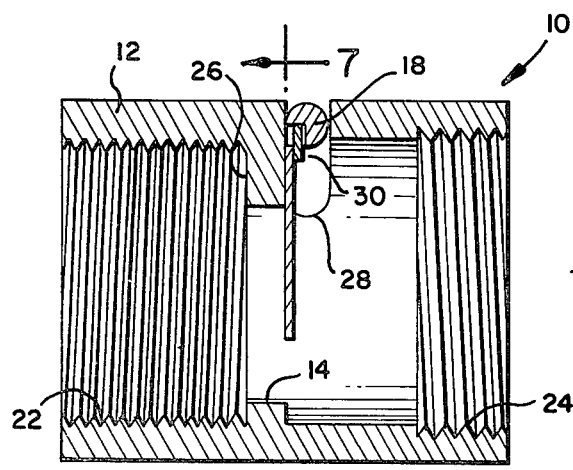
FIG. 3, is a view in vertical and longitudinal section showing the valve plate partially lowered into the valve housing in the fabrication thereof.
Figure 4:
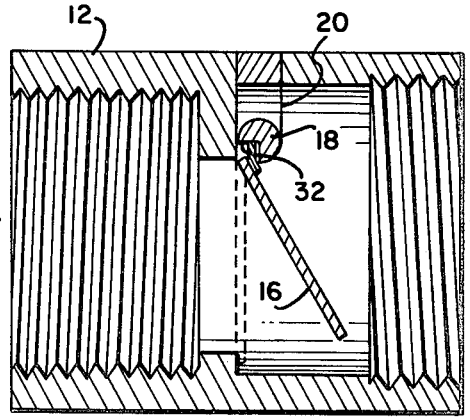
FIG. 4, is a view taken similarly to FIG. 3, but showing the valve in the fabricated condition and the valve in the open position.
Figure 5:
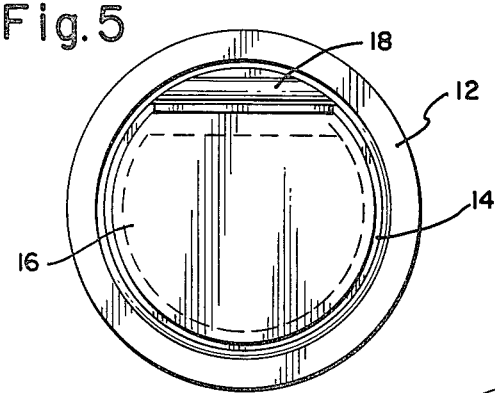
FIG. 5, is a view in end elevation of the valve taken from the right end of FIG. 3.
Figure 6:
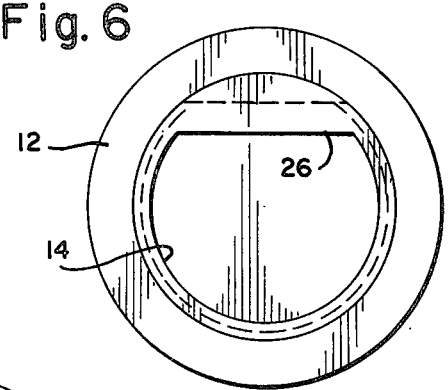
FIG. 6, is a view in end elevation taken from the left end of FIG. 3.
Figure 7:
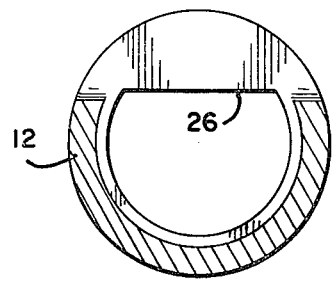
FIG. 7, is a reduced scale view in section taken on line 7—7 of FIG. 3.

The valve housing is more particularly shown in FIGS. 3 and 4 and may be internally threaded at its ends 22 and 24, as shown, to receive conventional threaded plastic pipe or tubing, as desired. Valve seat 26 has an enlarged chord-like baffle or lip portion 26 at the top. The valve member is hinged to the support arm at the bottom of baffle portion 26 and a barrier to flow is required at this point. Valve housing slot 20 has a rounded lower wall portion 28 to receive the cylindrical support arm 18 and seat it.

The valve member 16 is connected by a flexible hinge member 32 to the support arm as best shown in FIGS. 3 and 4. This hinged connection is accomodated by cementing or the like and the hinge fits within a cut-out quarter or notch portion 32 of the support arm. Closure of the slot when the valve support arm 18 has been seated in the slot is accomodated by an arc-like cover 34 which seats over the top of the support arm and closes the slot by appropriate cementing or the like. While the valve member is shown connected by the flexible hinge member to the support arm, it will be understood that various other types of conventional hinges may be used as desired.

A modified form of the check valve is shown in FIGS. 8 through 14 and is generally indicated by the reference numeral 40. Like parts which perform the same function are given the same reference numerals. Thus the valve 40 is comprised of a tubular housing 12 and an internal ring-like valve seat 14. The housing may be threaded at the left end internally at 22 and at the right end 24 for connection to internally threaded pipe or tubing.

In this modification the circular valve member 16 has a chord boundry 42 and is pivotally supported adjacent thereto on a shaft 44. The shaft is supported in a chord position within the tubular housing by insertion through a pair of openings 46 and 48 in the tubular housing.

The valve member 16 is supported upon the fixed shaft 44 by a sleeve portion 50 fixed to the valve member by cementing at 52 or other conventional means of affixation. The sleeve loosely receives a valve shaft 44 for pivotal movement and is freely supported thereon.

In order to close off the portion of the valve housing above the valve shaft a closure baffle 54 is employed. This baffle is of a chord like nature and has a bevel edge 56 against which a beveled edge 58 of the valve member is adapted to seat in the closed position. The baffle member 54 may be connected to the ring-like valve seat 14 by cementing or as will be readily understood may be cast integrally in the fabrication of the valve housing.

The valve construction is made of rigid plastic with low cost and ease in fabrication and functions efficiently in the usual manner of a uni-directional check valve. Thus, in the open positions in FIGS. 4 and 11, when the direction of flow is in the direction of the arrow the valve provides for a simple uni-directional flow. When the flow is reversed and proceeds from the right end to the left end the force of the fluid simply closes the valve against the valve seat to close the valve.

FABRICATION AND USE

The valve in this invention is simply fabricated from a simple tubular valve housing provided with the slot in the first embodiment 10 of this invention by placing the valve member and the connected support arm through the slot as shown in FIG. 3. The support arm is seated against the wall 28 in the slot and the cover 34 is placed over the top of the slot and cemented in place or otherwise secured to hold the support arm in a secured position in the valve housing and in sealed relation.

The valve, after its construction in the simple manner above described, is ready for use in a variety of installations. The valve housing through its internal threading can be connected to appropriate piping and tubing as desired and acts as a uni-directional check valve in a conventional fashion.

Through the valve construction of this invention where the chord-like slot in the valve housing is slightly longer than the diameter of the valve member the valve and support arm can be simply inserted into the valve housing. Since the valve member is slightly larger than the internal diameter of the valve seat the valve member is caused to seat against it. The chord-like portion of the valve seat provided by the lip or baffle 26 blocks off the upper portion of the valve and through the hinging of the valve member to the support arm complete closure is effected when the valve is closed, yet the valve can be very simply opened to provide a through flow as the direction of fluid flow is reversed. It will be understood that the valve support arm 18 may be made integral with the cover as desired to integrate the chord-like barrier 26. Such changes and modifications are within the spirit and teaching of this invention as will be readily apparent.

The modified check valve 40 of this invention shown in FIGS. 8 through 14 is likewise simply fabricated. The valve member 16 with the sleeve 50 is first inserted in the tubular housing at approximately the closed position shown in FIG. 10. This registration is simply effected through the tapering or bevelled edge 56 of the baffle member which receives the bevel edge 58 of the valve member to effect a simple registration. At this point the valve shaft 44 is inserted through one of the openings 46 or 48 and passed through the sleeve of the valve member and into the other opening of the valve housing. When this has been effected, the ends of the valve shaft may be sealed in the openings by cementing or other conventional means of closure. The check valve is then ready for use.

In use the modified check valve operates in a similar fashion to the check valve 10 and in a similar fashion to conventional check valves. Thus when the flow through the housing of the fluid is from the left portion of FIGS. 10 and 11 the force of the fluid will cause the check valve to open to the open position shown in FIG. 11. When the flow is reversed, and passes from the right end to the left end the force of the fluid against the check valve member 16 will cause it to close and seat in position shown in FIG. 10. The free rotation of the valve plate upon the fixed valve shaft 44 facilitates the opening and closing and permits the check valve to operate in the conventional fashion responsive to the direction of flow of the fluid in the valve housing.

Various changes and modifications may accordingly be made within this invention as will be obvious to those skilled in the art. Such changes and modifications are within the scope and teaching of this invention as defined by the claims appended hereto.

What is claimed is:

1. A tubular check valve comprising a tubular housing, a pivotable valve member, a shaft supporting said valve member for pivotable movement from an open position to a closed position against a valve seat formed of an inwardly extending circular wall member on said housing, said shaft being supported at opposite ends upon openings formed in the wall of said valve housing, the valve member being hingedly connected to said support shaft, said support shaft being seated in a chord-like opening across said housing and a cover member seated on top of said support shaft to close said opening.

2. The check valve of claim 1, in which said valve seat includes an upper chord-like portion extending upwardly from said support shaft and closing an upper portion of the interior of said valve housing above said valve member.

3. The check valve of claim 1, in which the valve member has a width slightly less than the length of said chord-like opening in order that it may be fitted externally through said opening to seat said support shaft.

4. The check valve of claim 3, in which the valve member is generally circular and said valve seat has an internal diameter slightly less than the diameter of said valve member.

5. A tubular check valve comprising a tubular housing, a pivotable valve member, a shaft supporting said valve member for pivotable movement from an open position to a closed position against a valve seat formed of an inwardly extending circular wall member on said housing, said shaft being supported at opposite ends upon openings formed in the wall of said valve housing, said valve seat including an upper chord-like portion extending upwardly from said support shaft and closing an upper portion of the interior of said valve housing above said valve housing above said valve member and said chord-like portion of the valve seat having a beveled edge against which a beveled edge on a chord-like boundary of the valve member is engageable.

6. The check valve of claim 5, in which said valve member is connected to a sleeve member loosely fitting upon said support shaft.

7. A tubular check valve comprising a tubular housing, a pivotable valve member, a shaft supporting said valve member for pivotable movement from an open position to a closed position against a valve seat formed of an inwardly extending circular wall member on said housing, said shaft being supported at opposite ends upon a chord-like opening means formed in the wall of said valve housing, said valve seat including an upper chord-like portion extending upwardly from said support shaft and closing an upper portion of the interior of said valve housing above said valve member, said valve seat chord-like portion extending inwardly within said housing and with said inwardly extending circular wall member forming a vertical wall within said housing, said valve member having a generally circular shape and a diameter slightly greater than the internal diameter of said valve seat, said valve member further having an upper chord-like edge overlapping a bottom of the upper chord-like portion of the valve seat.

* * * * *